US006145375A

United States Patent [19]

Holler

[11] Patent Number: 6,145,375

[45] Date of Patent: Nov. 14, 2000

[54] TIMING DEVICE

[76] Inventor: Mark Arnold Holler, 118 Meadow La., Jones Creek, Tex. 77541

[21] Appl. No.: 09/233,952

[22] Filed: Jan. 20, 1999

[51] Int. Cl.$^{7}$ .................................................... G01M 15/00

[52] U.S. Cl. ................................ 73/116; 74/527; 33/600

[58] Field of Search .................................. 73/116, 119 R; 74/527; 33/600, 605

[56] References Cited

U.S. PATENT DOCUMENTS

| | | | |
|---|---|---|---|
| 4,683,747 | 8/1987 | Hall | 74/119 R |
| 4,895,016 | 1/1990 | Cameron et al. | 73/116 |
| 4,930,371 | 6/1990 | Schneider . | |
| 5,440,947 | 8/1995 | Manganelli . | |

*Primary Examiner*—Eric S. McCall
*Attorney, Agent, or Firm*—Mark B Jones

[57] ABSTRACT

A timing device for locking a fly wheel of an engine in place for timing purposes comprising a bushing with a threaded portion at one end that engages a threaded aperture in the bell housing of a diesel engine. A timing or locking pin is disposed within the bushing and is movable longitudinally therein. A washer is disposed between the locking pin and the bushing. A spring is attached at either end to the washer. The spring may be used to bias the locking pin into engagement with a detent in the flywheel. Removal of the spring from the locking pin allows the pin to be removed from the detent in the flywheel.

19 Claims, 4 Drawing Sheets

TIMING DEVICE

BACKGROUND OF THE INVENTION

The invention relates to the timing of engines. More particularly to the timing of diesel engines by inserting a shaft into the flywheel timing hole to lock the flywheel in a predetermined orientation of the engine crankshaft so that the engine can be tuned. More particularly this allows the valves and injectors to be adjusted. This invention is especially useful for the tuning of Caterpillar engines.

U.S. Pat. No. 4,683,747 (Hall) discloses a timing pin assembly for a diesel engine. The apparatus includes a mounting plate, a housing assembly having a pressure and pilot guide side and a pin. When the flywheel timing hole is alined with the aperture in the mounting plate the pin maybe displaced into the timing hole by a pneumatic, electrical or mechanical means. This allows the user to set the pin without leaving the vehicle's engine compartment.

U.S. Pat. No. 4,895,016 (Cameron et al) discloses a timing assembly for a diesel engine which includes a threaded portion which is secured to the bell housing of the engine. Another name for bell housing used interchangeably in this field is flywheel housing. The device includes a threaded portion which is secured to the bell housing of a diesel engine. A spring biased piston extends through the bell housing and into a depression or detent in the fly wheel of the diesel engine. When the detent is aligned with the aperture in the bell housing through which the pin extends, the pin engages the detent to lock the flywheel, and accordingly the crankshaft and camshaft, in their predetermined locations. The locations are either at the 0 degree or 360 degree locations of the crankshaft. The timing of the valves and fuel injection is made in reference to both the 0 degree and 360 degree location.

The pin in the '016 patent is manually retracted by a finger secured to the pin. The finger extends outwardly from the housing of the pin for the manual retraction. The device may be secured to the bell housing and the pin will be spring biased against the flywheel. The engine is turned over until the depression or detent in the flywheel is aligned with the pin, and the bias of the compression spring against the pin moves the pin into the detent to lock the flywheel in the desired location.

U.S. Pat. No. 5,440,947 (Manganelli) discloses a timing assembly for a diesel engine which includes a threaded portion which is secured to the bell housing of the engine. A timing or locking pin is disposed within the cylinder and is movable longitudinally therein. Two springs oppose each other in biasing the timing or locking pin. A heavier spring extends between the outer end of the cylinder and a head on the pin, and a lesser spring extends between the head of the pin and the inner head of the cylinder. The heavier spring biases the timing pin into engagement with a detent in the flywheel, while the lighter spring retracts the pin from the detent. The cylinder has locking detents into which the sleeve pin may be moved to provide locking bias to move the timing pin inwardly into the recess or detent in the flywheel. When the sleeve pin is moved out of the detents, the force of the larger spring is relieved and the lighter spring moves the timing pin out of the detent to allow the flywheel to move.

Due to the general design engines, especially diesel engines, the space available in the engine compartment is limited. In many instances access to the location of the flywheel timing hole is limited by placement of other engine components. Due to these close quarters in which the timing pin apparatus is used, it is sometimes very difficult to insert and remove the timing lock pin device of the patents described before. The distance the timing assembly extends from the surface of the flywheel or bell housing many times makes it impossible to place the prior art on the housing. The devices are also difficult to repair should one of the springs break or the pin becomes bent. In many instances the pins used in the prior art will become bent if the engine is started while the pin in inserted into the detent of the fly wheel. In extreme cases the pin may be sheared off with the pin becoming lodged in the detent of the fly wheel. This results in the extensive maintenance to the engine. The maintenance of devices of the prior art is also a problem due to the dirt and grit that is present in all engine compartments. The problem with tight quarters, cost of the devices, repairs of the prior art and damage to the engine are overcome by the device of the present invention.

SUMMARY OF THE INVENTION

The invention comprises a bushing with a threaded portion at one end that engages a threaded aperture in the bell housing of a diesel engine. A timing or locking pin is disposed within the bushing and is movable longitudinally therein. A washer is disposed between the bell housing of the engine and the bushing. A spring is attached at either end to the washer. The spring may be used to bias the locking pin into engagement with a detent in the flywheel. Removal of the spring from the locking pin allows the pin to be removed from the detent in the flywheel.

Among the objects of this invention is the providing of a device for locking a flywheel in place for the timing of an engine; providing a device which may be readily modified to fit within the confines of tight engine compartments; and to allow the device to be readily repaired and maintained. This device has the added advantage of making a two man operation into a job that a single mechanic may perform. It allows a single mechanic to rotate the flywheel with positive engagement being achieved every time.

DESCRIPTION OF THE INVENTION

Figure 1:
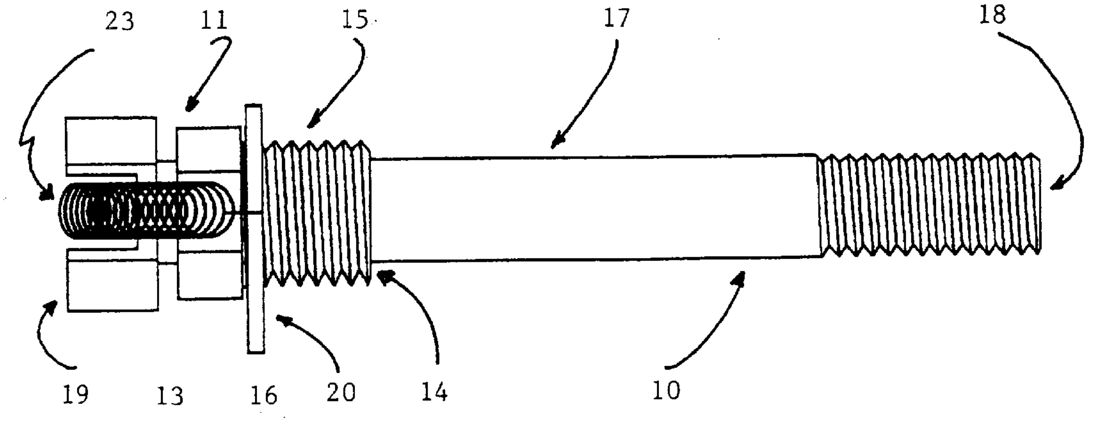
FIG. 1 is a perspective view of the device of the present invention.
Figure 2:
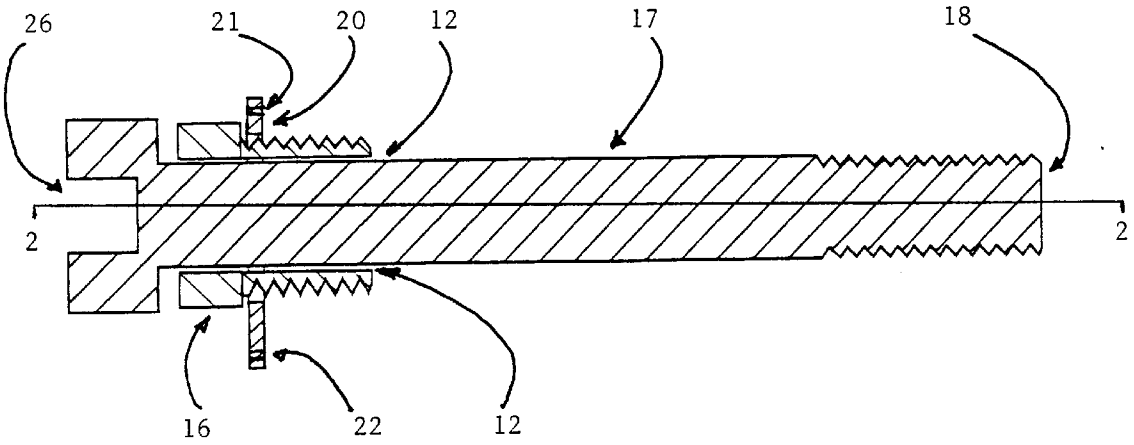
FIG. 2 is a side view taken along line 2—2 of FIG 1.

FIG. 1 is a perspective view of a timing lock device 10 of the present invention usable in the timing of engines, especially diesel engines. FIG. 2 is a side view generally taken along line 2—2 of FIG. 1. Referring to FIG. 1 it may be seen that the timing lock device 10 of the present invention includes a bushing 11 which includes a longitudinally extending bore 12. The bushing 11 includes a rear end 13 and a front end 14. Extending rearwardly front the from end 14 are external threads 15. The external threads 15 terminate adjacent to a plurality of wrench flats 16. The wrench flats 16 are located at the rear end 13 of the bushing.

Disposed within the bore 12 is the timing pin 17. The timing pin 17 extends outwardly beyond the end of the front end 14 of the bushing 11 and terminates outwardly in a shaped front end 18. It is obvious to anyone skilled in the art that the shaped front end may be flat with a more preferred embodiment being a rounded front end. The timing pin 17 extends outwardly beyond the end of the rear end 13 of the bushing 11 and terminates in a rear head 19 with a diameter larger than the diameter of the bushing bore 12.

A washer 20 is placed between the front end 13 of the bushing 11 and the bell housing of the engine. The washer 20 contains a first hole 21 and a second hole 22 placed in a line parallel to the first hole 21. A spring 23 having a first end 24 and a second end 25 is connected to the washer 20 by the first end 24 and second end 25 of the spring 23 being attached to the first hole 21 and the second hole 22 of the washer 20.

The washer 20 may be purchased at any hardware store and may be comprised of ordinary steel or zinc plated iron. It is more preferable for the washer 20 to be made from brass or stainless steel to avoid corrosion. It is evident to one skilled in the art that the center hole in the washer needs to be larger than the diameter of the timing pin 17. In many instances a washer may not be placed directly against the bell housing due to an protrudance from the engine. A preferred embodiment of the present invention involves the use of a washer which has been truncated approximately two-thirds along the washer's diameter. Use of a truncated washer enables the washer to be situated in such a manner that it lies flat against the bell housing of the engine. The spring 22 may be of any diameter or length provided that it short enough to bias the timing pin 17 against the fly wheel of the engine.

It is readily apparent to one skilled in the art that a pipe bushing or similar construction may be used as the bushing 11. The use of a pipe bushing will require that the internal bore 12 of the bushing 11 be larger than the diameter of the timing pin 17. The bushing 11 may be made out of any metal common in the art but it is preferable that it be made out of stainless steel or brass to avoid corrosion problems.

The rear head 18 of the timing pin 17 may be flat. A more preferred embodiment is a raised head having a horizontal slot 26 across it's face sufficient in size to accommodate the spring 23. The locking pin should be of a grade 8 bolt or higher quality. A pin having this strength will not shear off or bend should the engine be inadvertently started. Those skilled in the art are aware that the detent in the flywheel is internally threaded. It is therefore a prefered emboidment that the timing pin have external threads extending rearwardly from the front end 18. It is obvious to one skilled in the art that use of a threaded pin has the additional advantage of locking the fly wheel in place should the engine be started. This is accomplished by the slight torquing action of the flywheel causing the external threads of the timing pin 17 to forwardly engage the internal threads of the flywheel.

Figure 3:
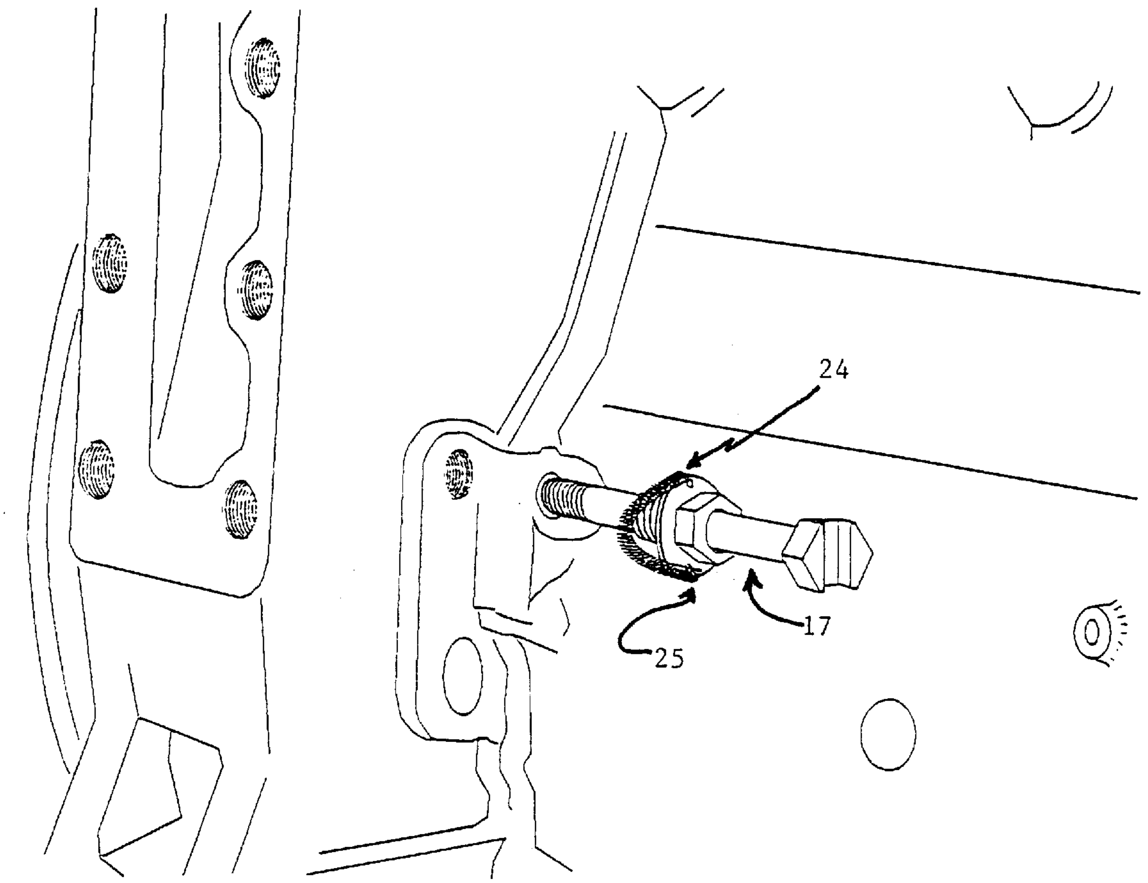
FIG. 3 shows the device being placed against the bell housing of the engine.
Figure 4:
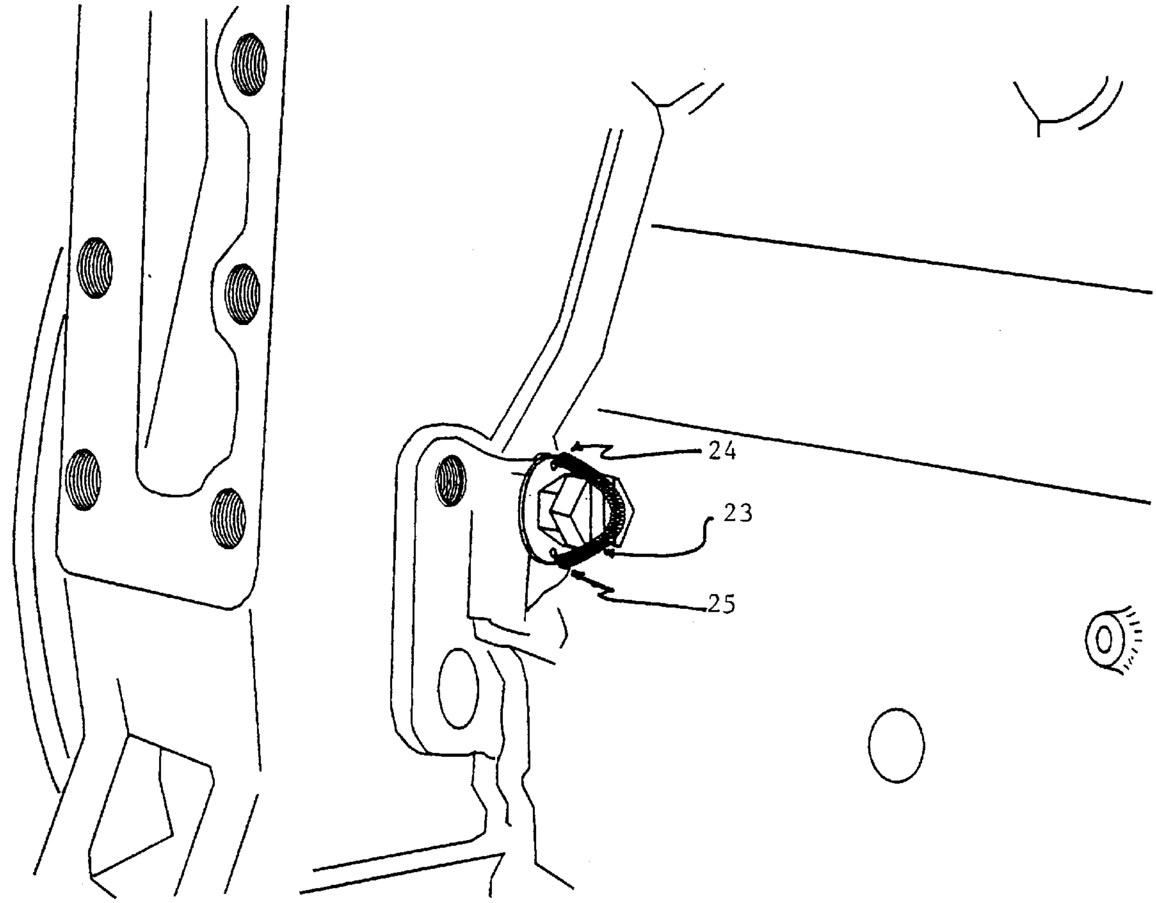
FIG. 4 shows the device with the locking pin inserted in the bushing.

The use of the timing device 10 is illustrated in FIG. 3, which shows the device being placed against the bell housing of the engine with the locking pin disengaged.

Figure 5:
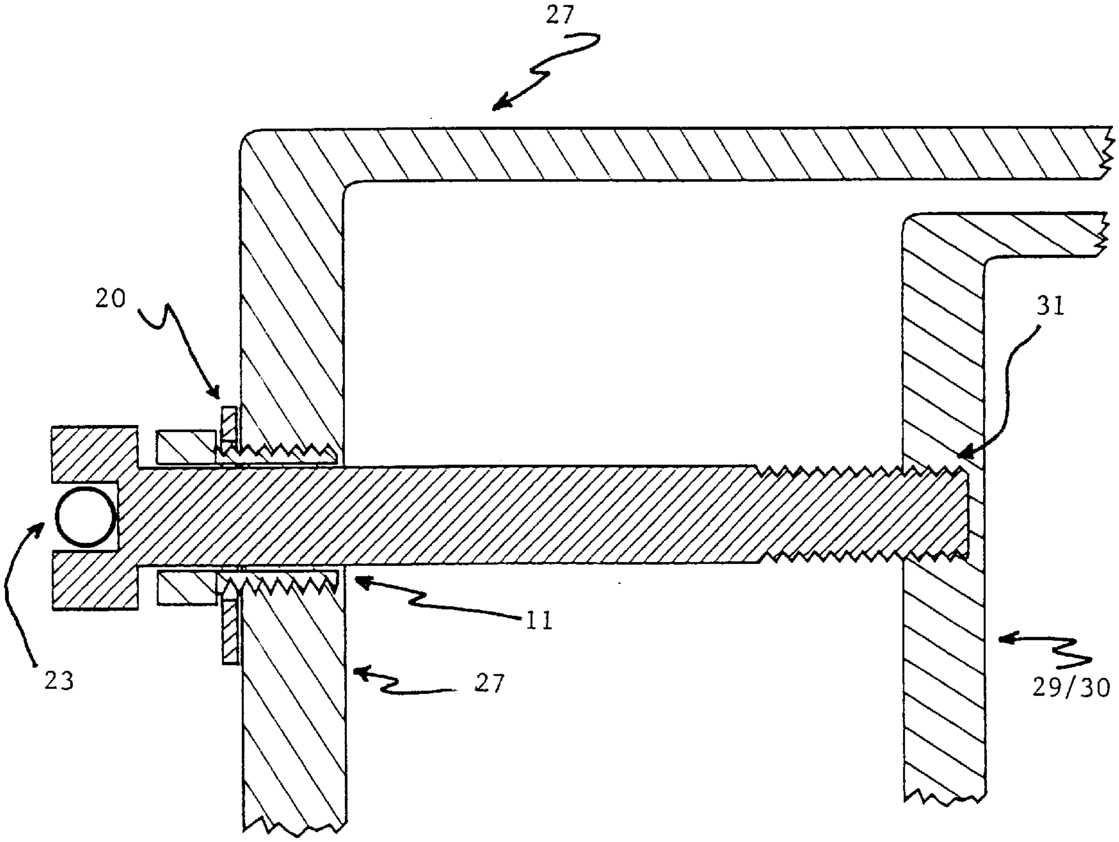
FIG. 5 is a partially cut-away side view of a bell housing and a fly wheel illustrating the manner in which the timing device locks the fly wheel.

FIG. 5 shows the device with the locking pin engaged to lock the fly wheel.

The use of the timing device 10 is illustrated in FIG. 5, which comprises a schematic illustration, in partial section, of an engine, including a bell housing 27.

The use of the timing device 10 is further illustrated in FIG. 5, which comprises a schematic illustration, in partial section, of an engine, including a bell housing 27. The bell housing 27 includes a threaded aperture 28 disposed adjacent to the engine flywheel 29. The flywheel 29 is secured to the engine crankshaft 30. The flywheel 29 includes a timing detent 31. When the timing detent 31 is aligned with the threaded aperture 28 in the bell housing 27, the flywheel 29 is appropriately positioned for timing the engine. The procedure for timing an engine by adjusting the valves or injectors is well known in the art.

When the timing detent 31 is adjacent to the threaded aperture 28, the tool 10 is threadedly secured to the bell housing 27 by inserting the exterior threaded portion 15 into the threaded aperture 28. The device 10 may be tightened by hand or the wrench flats 16 used to appropriately tighten the device 10 to the bell housing 27. The spring 23 is placed on the flat portion of the timing pin which disposes the front end 18 of the timing pin 17 against the front face of the flywheel 29.

The engine is rotated until the detent 31 of the fly wheel 29 aligns with the front end 18 of the timing pin. The spring 23 causes forward bias of the timing pin 17. The forward bias moves the timing pin 17 into the detent 31 of the flywheel 29 as soon as the detent 31 is aligned with the timing pin 17. The flywheel 29 is locked into place for timing purposes and the appropriate adjustments to the engine may be made. The timing pin may be threaded into the fly wheel to further secure said fly wheel. Should the engine be started the rotation of the fly wheel 29 will result in the threads of the timing pin 17 to forwardly engage the internal threads of the fly wheel and hold the fly wheel in place. After the adjustments are made to the valves of the engine, the spring 23 is removed from the rear head 19 of the timing pin 17 and the timing pin 17 is withdrawn from the detent 31 of the flywheel 29. The flywheel 29 may then be rotated until the detent 31 is again aligned with the aperture 28 for the next timing procedure. The timing tool 10 is then used again as described above. After the timing of the engine is completed, the timing pin 17 is retracted and the timing device 10 is removed from the bell housing 27 by disengaging the threads 15 from the threaded aperture 28 by means of a wrench or any other method commonly used in the art.

It is obvious to those skilled in the art that the length of the timing pin 17 is controlled by the space available between the bell housing 27 and other members of the engine. The present invention allows the selection of timing pins 17 with different lengths to aid in the insertion and removal of the device.

I claim:

1. Engine timing device comprising (a) bushing means secured to a bell housing of an engine, said bushing means having a bore;

(b) pin means movable in said bore, said pin means being adapted to engage a detent in a flywheel of said engine;

(c) a washer, separable from and external to said bushing means, disposed between said bushing means and said bell housing; and (d) means for biasing said pin means against said flywheel, said biasing means being attached to said washer.

2. The engine timing device of claim 1 wherein the washer has holes.

3. The engine timing device of claim 2 wherein the holes in the washer arc in a line.

4. The engine timing device of claim 1 wherein the washer is truncated.

5. The engine timing device of claim 1 wherein the biasing means is a coil spring.

6. The engine timing device of claim 2 wherein the biasing means is a coil spring attached to the holes in the washer.

7. The engine timing device of claim 1 wherein said pin means has a threaded front pin portion extending out of said bore.

8. The engine timing device of claim 1 wherein said pin means has a rounded front pin portion extending out of said bore.

9. The engine timing device of claim 1 wherein (a) the washer has holes in a line, (b) the biasing means is a coil spring attached to the holes in the washer, (c) said pin means has (i) a threaded front pin portion, and (ii) a back pin portion with a slotted head, and (d) the coil spring is placed in the slot on the head of said back pin portion.

10. Engine timing device comprising:

(a) bushing means secured to a bell housing of an engine, said bushing means having a bore;

(b) pin means movable in said bore, said pin means having (i) a front pin portion extending out of said bore and adapted to engage a detent in a flywheel of said engine, and (ii) a back pin portion with a head extending out of said bore;

(c) a washer, separable from and external to said bushing means, disposed between said bushing means and said bell housing; and (d) means for biasing said pin means against said fly wheel, said biasing means being placed on the head of said back pin portion.

11. The engine timing device of claim 10 wherein the washer has holes.

12. The engine timing device of claim 11 wherein the holes in the washer are in a line.

13. The engine timing device of claim 10 wherein the washer is truncated.

14. The engine timing device of claim 10 wherein the biasing means is placed in a slot on the head of the back pin portion.

15. The engine timing device of claim 10 wherein the biasing means is a coil spring.

16. The engine timing device of claim 10 wherein the biasing means is attached to the washer.

17. The engine timing device of claim 10 wherein the front pin portion is threaded.

18. The engine timing device of claim 10 wherein the front pin portion is rounded.

19. The engine timing device of claim 10 wherein (a) the washer has holes in a line, (b) the biasing means is a coil spring attached to the holes in the washer, (c) the coil spring is placed in a slot on the head of the back pin portion, and (d) the front pin portion is threaded.

* * * * *